United States Patent
Bergmann et al.

(10) Patent No.: US 6,430,337 B1
(45) Date of Patent: Aug. 6, 2002

(54) OPTICAL ALIGNMENT SYSTEM

(75) Inventors: Ernest E. Bergmann, Fountain Hill Borough; Stephen K. Fairchild, Mertztown, both of PA (US)

(73) Assignee: Agere Systems Optoelectronics Guardian Corp., Allentown, PA (US)

( * ) Notice: Subject to any disclaimer, the term of this patent is extended or adjusted under 35 U.S.C. 154(b) by 0 days.

(21) Appl. No.: 09/145,988

(22) Filed: Sep. 3, 1998

(51) Int. Cl.$^7$ ................................................ G02B 6/36
(52) U.S. Cl. ............................ 385/25; 385/52; 385/73
(58) Field of Search ........................ 385/15–26, 31–38, 385/47, 49, 50, 52–94, 139

(56) References Cited

U.S. PATENT DOCUMENTS

| | | | |
|---|---|---|---|
| 3,938,895 A | 2/1976 | Bridger et al. ............ 356/141.3 |
| 4,103,154 A | 7/1978 | d'Auria et al. ......... 250/227.24 |
| 4,135,779 A | 1/1979 | Hudson ........................ 385/45 |
| 4,296,998 A | 10/1981 | Dufft ............................ 385/90 |
| 4,302,071 A | 11/1981 | Winzer ......................... 385/25 |
| 4,435,037 A | 3/1984 | Abramson et al. ............. 385/90 |
| 4,470,662 A * | 9/1984 | Mumzhiu ..................... 385/19 |
| 4,673,244 A | 6/1987 | Miles ........................... 385/38 |
| 4,679,908 A | 7/1987 | Goodwin ...................... 385/91 |
| 4,688,884 A | 8/1987 | Scifres et al. ................. 385/38 |
| 4,690,492 A | 9/1987 | Beard .......................... 385/89 |
| 4,741,586 A | 5/1988 | Kim et al. ..................... 385/28 |
| 4,747,657 A | 5/1988 | Chaoui et al. .............. 700/279 |
| 4,755,021 A | 7/1988 | Dyott .......................... 385/12 |
| 4,778,241 A | 10/1988 | Haltenorth ................... 385/91 |
| 4,834,492 A | 5/1989 | Ishii et al. .................... 385/91 |
| 4,838,639 A | 6/1989 | Morankar et al. ............ 385/86 |
| 4,919,508 A | 4/1990 | Grace et al. .................. 385/56 |
| 4,989,940 A | 2/1991 | Wollenweber et al. ........ 385/35 |
| 5,020,873 A | 6/1991 | Althaus et al. ............... 385/90 |
| 5,044,717 A | 9/1991 | Levatter ....................... 385/33 |
| 5,095,517 A * | 3/1992 | Monguzzi et al. ............ 385/90 |
| 5,131,745 A | 7/1992 | Whitney et al. ............. 356/153 |
| 5,157,750 A | 10/1992 | Grace et al. .................. 385/76 |
| 5,177,348 A | 1/1993 | Laor ....................... 250/201.1 |
| 5,267,993 A | 12/1993 | Grace et al. .................. 606/11 |
| 5,459,804 A | 10/1995 | Stowe .......................... 385/42 |
| 5,461,692 A | 10/1995 | Nagel ......................... 385/127 |
| 5,535,297 A | 7/1996 | Goettsche .................... 385/90 |
| 5,600,741 A * | 2/1997 | Hauer et al. .................. 385/35 |
| 5,675,683 A * | 10/1997 | Takahashi et al. ............ 385/78 |
| 5,689,595 A | 11/1997 | Pan ............................. 385/27 |
| 5,703,992 A | 12/1997 | Bergmann .................. 385/139 |
| RE35,734 E | 2/1998 | Rondeau ...................... 385/78 |
| 5,727,110 A | 3/1998 | Smith ......................... 385/147 |
| 5,729,377 A | 3/1998 | Bergmann ................... 359/249 |
| 5,742,712 A * | 4/1998 | Pan et al. ..................... 385/18 |
| 5,745,620 A | 4/1998 | Bergmann .................... 385/56 |
| 5,745,624 A | 4/1998 | Chan et al. ................... 385/91 |
| 5,754,719 A | 5/1998 | Chen et al. ................... 385/34 |
| 5,768,453 A | 6/1998 | Gardner ....................... 385/33 |
| 5,771,120 A | 6/1998 | Bergmann ................... 359/484 |
| 6,081,635 A * | 6/2000 | Hehmann ..................... 385/24 |

* cited by examiner

*Primary Examiner*—Akm E. Ullah
*Assistant Examiner*—M. R. Connelly-Cushwa
(74) *Attorney, Agent, or Firm*—Dickstein Shapiro Morin & Oshinsky LLP

(57) ABSTRACT

An optical system is provided with an optical assembly and a wavelength division multiplexer surface for transmitting a light beam. The optimal alignment of these light beams is accomplished by adjusting a steering device, which includes an optical wedge or a universal coupling, until the light path of the transmitted light beam through the optical assembly aligns with the light path of the transmitted light beam through the wavelength division multiplexing surface.

33 Claims, 4 Drawing Sheets

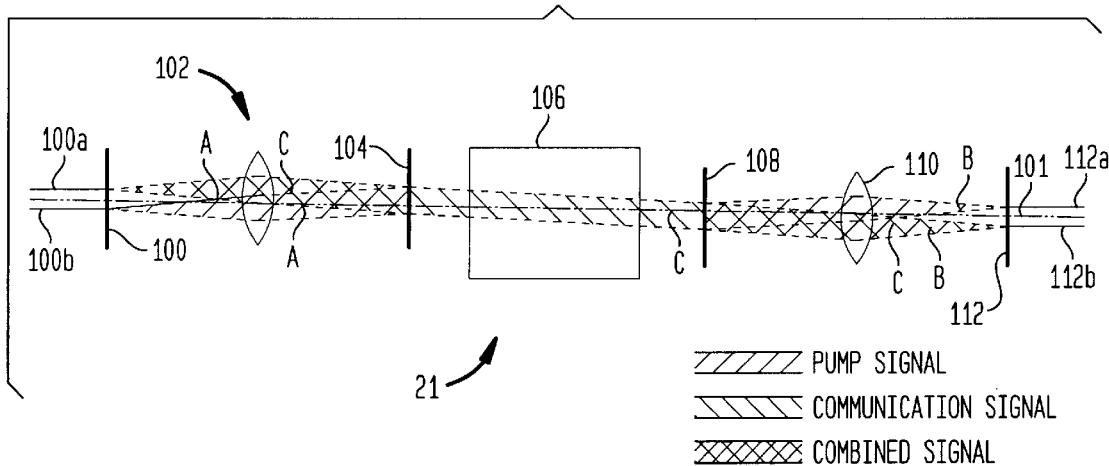
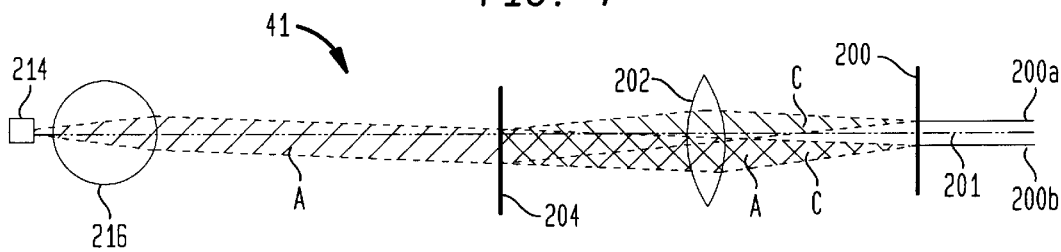

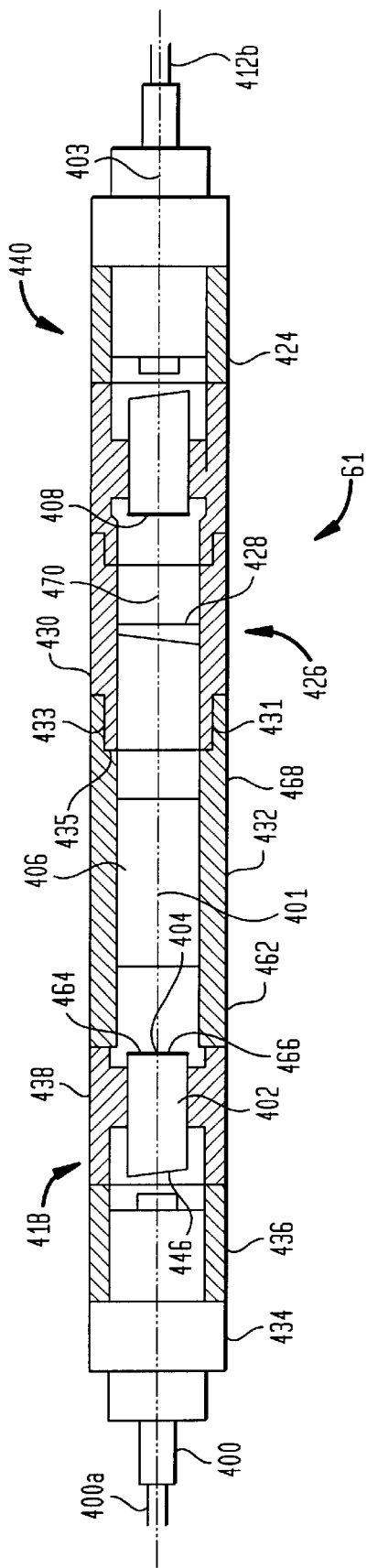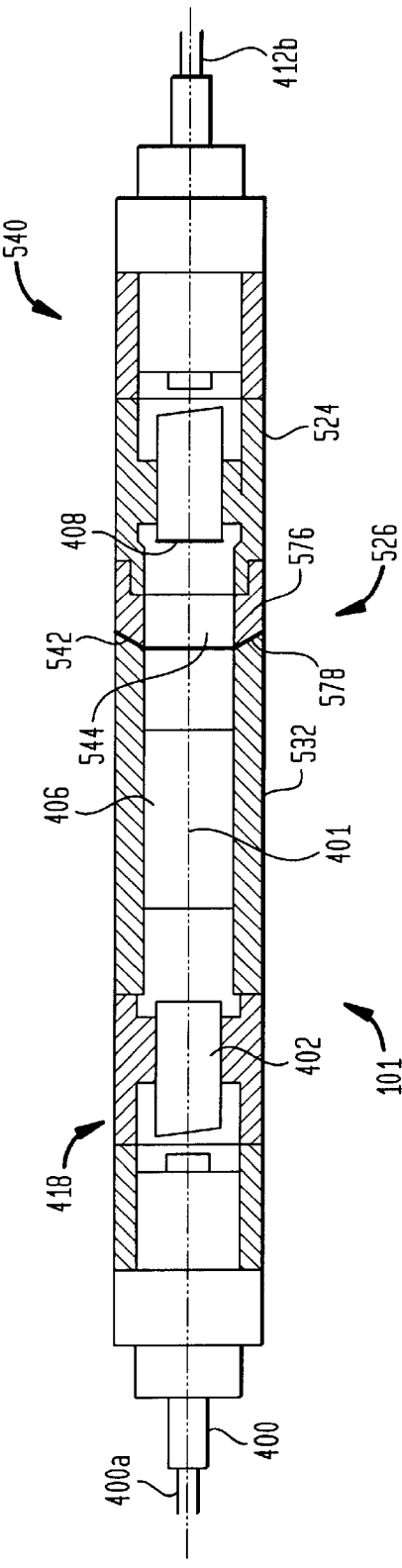

OPTICAL ALIGNMENT SYSTEM

FIELD OF THE INVENTION

The present invention relates to the coupling of optical components. More particularly, the present invention relates to the alignment of internal optical components and fiberoptic connections of optical devices to avoid signal losses in optical circuits.

BACKGROUND OF THE INVENTION

Optical communication systems, as well as other optical technologies, require devices that work with optical signals. The best known of such devices is perhaps the ubiquitous silica based optical fiber used for both short and long distance optical transmission. Other well known optical devices include filters, multiplexers, modulators, transmitters, receivers, and power splitters and combiners. The filters and multiplexers are useful in, for example, wavelength division multiplexing ("WDM") systems that have been developed to increase the capacity of optical communication systems by transmitting information at a plurality of differing wavelengths.

Certain characteristics of optical systems, such as the ability to carry considerable information at high speeds over long distances and resistance to electromagnetic interference, make them the technology of choice in many communication applications. Optics, however, also introduce certain complications not present in electronic systems. One complicated area in the optical communications field is the making and breaking of circuitry. Circuitry encompasses conduits, splices, connections and couplings. Typically, copper wire is used as an electronic conduit while fiber and air are used as optical conduits. Splices are semi-permanent junctions of conduits. Connections are temporary junctions between conduits. Couplings join three or more conduits. In electronic systems, splices, connections and couplings are easily made and losses in signals at wire junctions are often negligible because "electricity travels around corners" to follow a conducting path. In contrast, optical splices, connections and couplings are complicated, require care to make, and contribute measurable signal loss to a circuit. This is because light travels in straight lines. Careful engineering is required for light to be gently steered and redirected.

Moreover, unlike electronic systems wherein the orientation of junctions is generally unimportant, direction and alignment of junctions in optical systems is critical. Because the core of an optical fiber has a small diameter, and because optical fibers have a relatively narrow acceptance angle within which light is accepted, a light source must be carefully aligned with a receiving fiber in order to avoid junction losses. Similarly, if a fiber is not carefully aligned so that all emerging light falls onto the light-sensitive area of a detector, some light is lost and sensitivity is reduced. Other alignment issues exist in optical systems. For instance, certain lenses and other devices such as the WDM surfaces discussed below, work best when light passing through them is at nearly normal incidence.

Fiber alignment problems are appreciated in the art and substantial efforts have been made to address them. For two-fiber junctions, efficient splicing may be accomplished with sophisticated fusion splices that automatically align the fibers, and with various mechanical splices, such as capillary splices and v-groove splices. Efficient two-fiber connections use connector bodies with coaxial ferrules that align the fibers and that are mated by concentric, precision sleeves. Fused fiber and planar waveguide couplings are unitary couplings that have no internal alignment issues. Other, more elaborate couplings, especially those that incorporate bulk optic devices, require precise internal alignment in the presence of slight variations in the fabrication of piece parts.

Proper alignment of optical couplings has been given extensive consideration. U.S. Pat. No. 4,435,037 shows a light emitting diode mounted on a movable post within a housing in juxtaposition to the end of an optical fiber centered within a channel in a connector housing. The optical fiber is stationary whereas the post supporting the light emitting diode is moved by a probe inserted through multiple aligning ports until the diode is properly positioned for optimum light coupling into the fiber. U.S. Pat. No. 4,296,998 discloses adjustably positioning an optical fiber relative to a light source to optimize the light output at the end of the fiber and locking the fiber in position within an aperture. U.S. Pat. Nos. 4,135,779 and 4,103,154 disclose the coupling of a pair of optical fibers to a third optical fiber. U.S. Pat. No. 5,535,297 discloses a method of permanently deforming a housing to align a light source and an optical fiber.

U.S. Pat. No. 3,938,895 discloses a method for positioning an optical fiber that involves the passing of light through the optical fiber, detecting the output therefrom through the use of a detector and moving the optical fiber to achieve a desired relationship to the position detector. U.S. Pat. No. 4,989,940 shows a method and apparatus for aligning an optical fiber about a ball and socket support based on a four-gradient measuring device. U.S. Pat. No. 5,745,624 discloses an open loop search process that utilizes signal strength feedback to control the operation of a three-axis stage to position an optical fiber.

Even as these and other efforts progress, more elaborate couplings continue to be developed. For example, optical devices combining bulk optic devices with four or more fibers are in use and are extremely difficult to align. Accordingly, a system for simply and inexpensively aligning fiber optic couplings incorporating bulk optic devices and multiple fibers is required.

SUMMARY OF THE INVENTION

The present invention provides a method and apparatus for providing internal alignment of light pathways in an optical device. In accordance with the present invention, an optical steering device is provided for aligning first and second light paths. A first optical element has the first light path which is directed towards the second optical element. The second optical element, which may be rotatable, has the second light path which is directed towards the first optical element. An adjustable steering assembly, which may include a rotatable optical wedge or a ball joint, is used to align the first and second light paths.

In one embodiment of the invention, an optical system includes an optical assembly and a wavelength division multiplexer surface for transmitting a light beam. An adjustable steering assembly is located between this optical assembly and the wavelength division multiplexing surface to align them.

In another embodiment of the invention, an optical amplifier device has a first housing supporting a first optical element which defines a first light path, and a second housing supporting a second optical element which defines a second light path. An adjustable element is located between the first and second housings for changing the direction of the first light path to cause it to align with the second light path.

The invention includes a method of making a multiple optical fiber device, including a first step of transmitting a first light beam along a first direction (or path) through a first optical element, a second step of adjusting the position of a steering assembly to change the direction of the first light beam, and a third step of transmitting the light beam through a second optical element.

The invention also includes a method of operating an optical amplifier device. First, a pump laser is transmitted through a first housing along a first light path. Second, a modulated communication signal is transmitted through a second housing along a second light path. Third, the direction of light propagated through the optical amplifier device is changed to align the first and second light paths. Fourth, the pump laser beam and the modulated communication signal are multiplexed to amplify the modulated communication signal.

The above and other advantages and features of the invention will be more readily understood from the following detailed description of the invention which is provided in connection with the accompanying drawings.

BRIEF DESCRIPTION OF THE DRAWINGS

FIG. 2 is a schematic diagram of an optical device having internal transmissive and reflective bulk optics and two dual fiber terminations.

FIG. 4 is a schematic diagram of an optical device having an internal pump laser and a dual fiber termination.

FIG. 5 is a schematic diagram of a WDM assembly and a steering assembly.

FIG. 6 is a partial sectional view of an optical device with transmissive bulk optics, a WDM assembly, and a steering assembly.

FIG. 10 is a sectional view of an optical device with transmissive bulk optics, a WDM assembly and a universal steering assembly.

DETAILED DESCRIPTION OF PREFERRED EMBODIMENTS

Figure 1:
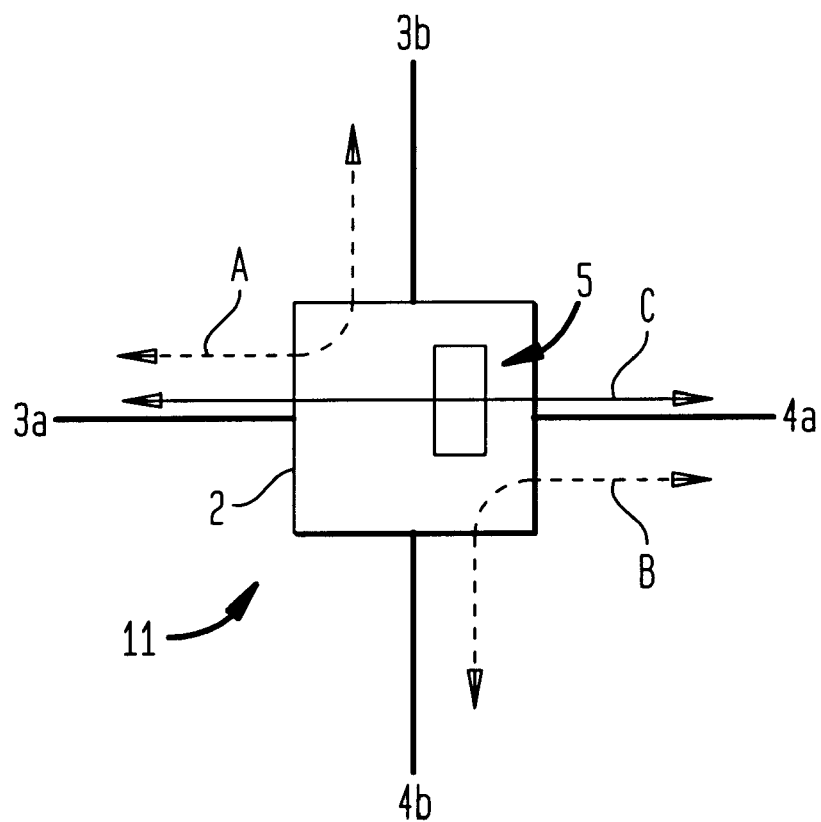
FIG. 1 is a schematic diagram of an optical device having internal transmissive bulk optics and four fibers.

Shown in FIG. 1 is a four fiber device 11 having a housing 2 and first, second, third, and fourth fibers 3a, 3b, 4a, 4b. Pump laser or monitored signals are transmitted between the first and second fibers 3a, 3b, and between the third and fourth fibers 4a, 4b, as shown by dotted lines A, B. A communication signal C is transmitted between the first and third fibers 3a, 4a.

A pump laser is a steady light source used to provide optical energy. Typical pump lasers produce wavelengths of 980 nm or 1480 nm. A monitored signal is typically a fixed fraction of the communication signal C; a typical application is to average monitor signal power, as a measure of the average power of C. Transmissive bulk optics 5 may be present for performing certain operations to the signals. Such transmissive bulk optics 5 are well known in the art and may consist of free space, wedges, filters, wave plates, Faraday rotators, and the like; sometimes the bulk optics contain an isolator or isolating section. Each of these sets of bulk optics has a light pathway associated with it. So too do fiberoptic connections. (If an isolator or isolating section is present, the light path through it is restricted to propagation in only one direction) These light pathways must be carefully aligned to avoid signal losses. In practice, the bulk optics are large enough to support light beams of suitable diameters, with slight offsets, and with some variation of direction; it is the fiber connections that are the most demanding of careful alignment. It is understood that there is some variability in placement of pieceparts and the bulk optics may also cause slight or major shifts in the beam direction.

Typical applications of the four fiber device 11 are, depending on the internal apparatus of the device 11, an input to an amplifier, as a junction between two optical amplifiers, or the completion of an amplifier.

Shown in FIG. 2 is a sectional view of an optical device 21 with four fibers for implementing the function of the optical device 11 of FIG. 1. Aligned approximately along an axis 101 are a dual fiber termination 100 having first and second individual fibers 100a, 100b, a first lens 102, a first WDM surface 104, transmissive bulk optics 106, a second WDM surface 108, a second lens 110, and a second dual fiber termination 112, having third and fourth individual fibers 112a, 112b.

In operation, two multiplexed signals, consisting of a first pump signal A and a communication signal C, emit from first fiber 100a and are focused by first lens 102 onto first WDM surface 104. The pump signal A is reflected by the first WDM surface 104 and focused by the first lens 102 back to the second fiber 100b. (This example is not by way of restriction, the combined signals A, C could just as well have emitted from second fiber 100b and the communication signal C been focused back to first fiber 100a). The communication signal C is transmitted through the first WDM surface 104 and passes through the bulk transmissive optics 106. A second pump signal B emits from third fiber 112a and is focused by second lens 110 onto second WDM surface 108 where it is reflected. The second pump signal B combines with the communication signal C. The combined signals B, C are focused by the second lens 110 into the fourth fiber 112b.

Figure 3:
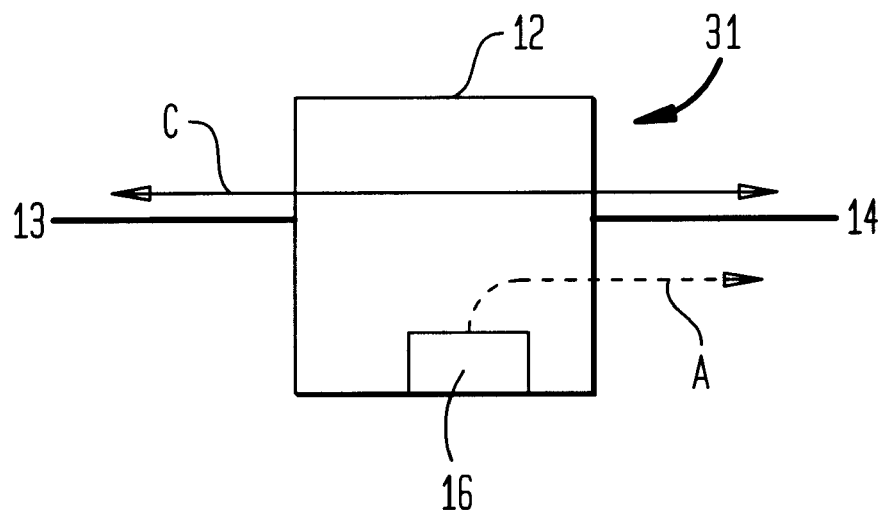
FIG. 3 is a schematic diagram of an optical device having an internal pump laser and two fibers.

Referring now to FIG. 3, a two fiber device 31 has a housing 12 wherein a pump signal, indicated by dotted line A, is multiplexed with a communication signal C. The pump signal A is generated by an internal pump laser 16. The communication signal C is carried by a first fiber 13. The combined signals A, C are propagated through a second fiber 14. A typical application of the two fiber device 11 is as part of an optical amplifier wherein the second fiber 14 is erbium-doped or spliced into an erbium doped fiber.

Shown in FIG. 4 is a sectional view of an optical device 41 with two fibers for implementing the function of the two fiber device 31 of FIG. 3. Aligned along an axis 201 in FIG. 4 are a laser pump 214, a ball lens 216, a WDM surface 204, a lens 202 and a dual fiber termination 200, having first and second individual fibers 200a and 200b. In operation, a communication signal C emits from first fiber 200a and is transmitted by lens 202 onto WDM surface 204, where it is reflected. Laser pump 214 emits a pump signal A which is collimated by the ball lens 216 and transmitted through the WDM surface 204. The pump signal A combines with the communication signal C. The combined signals A, C are focused by the lens 202 into the second fiber 200b.

In the systems shown in FIGS. 2 and 4, alignment of the optical signals is important for successful transmission of the light beams. In practice, where the beams are relatively broad, combining them so they focus successfully into a common fiber requires beams that are precisely parallel but only substantially overlapped. Hence, alignment of broad beams concentrates upon achieving precise parallelism.

A preferred embodiment of the invention which facilitates alignment of optical paths is shown in FIG. 5. FIG. 5 shows an optical system 51. The system 51 has the following optical elements: a WDM assembly 318, a steering assembly 326, and an optical device 332. The WDM assembly 318, the steering assembly 326, and the optical device 332 are approximately coaxially aligned on a common axis 301. The WDM assembly 318 has a generally cylindrical housing 324. A dual fiber termination 300 is located at one end 360 of the housing 324. The dual fiber termination 300 has first and second individual fibers 300a, 300b. At the other end 361 of the cylindrical housing 324 is a WDM surface 304. Located between the dual fiber termination 300 and the WDM surface 304 is a lens 302. The WDM surface 304, the lens 302 and the dual fiber termination 300 are located approximately along the axis 301. The steering assembly 326 has a light deflector, in this case an optic wedge 328, and a collar 330. The steering assembly 326 faces the WDM surface 304. The optical device 332 produces a collimated light beam C.

The optical path of the WDM assembly 318 is internally aligned so that a light beam entering from the first fiber 300a of the dual fiber termination 300 is transmitted by the lens 302, reflected by the WDM surface 304, and focused by the lens 302 to impinge directly on the second fiber 300b. The illustrated alignment may be passive, consisting only of the careful placement of the dual fiber termination 300, the lens 302 and the WDM surface 304 within the WDM assembly 318.

Alignment is preferably active, however, as follows: The dual fiber termination 300 and the lens 302 are carefully fixed along the axis of the WDM assembly 318. Next, the WDM surface 304 is placed in approximately its correct position. A test signal at a wavelength reflected by the WDM surface 304 is beamed through the first fiber 300a and reflected by WDM surface 304. A meter is used to measure the amount of light impinging on the second fiber 300b. The position of the WDM surface 304 is manipulated, by probes or other means known in the art, until the highest light meter reading is obtained. The highest meter reading indicates the position where the least signal loss occurs. It is at this optimal position that the WDM surface 304 is fixed by gluing or other means known in the art. It will be appreciated by those skilled in the art that the same active procedure can be employed by fixing any two of the dual fiber termination 300, the lens 302, and the WDM surface 304, and manipulating the third one. The present invention is not limited to the illustrated WDM assembly. Other optical elements may be employed.

The steering assembly 326 is assembled onto the optical device 332 by the method shown in FIG. 6, or other methods known in the art, so that the steering assembly 326 is free to rotate about its cylindrical axis, but is fixed in all other respects. The WDM assembly 318, in turn, is assembled onto the steering assembly 326, by the method shown in FIG. 6, or other methods known in the art, so that the WDM assembly 318 is free to rotate about its cylindrical axis but is fixed in all other respects. To complete the internal alignment, the steering assembly 326 and the WDM assembly 318 are rotated until the collimated beam C transmitted through the optical device 51 is optimally aligned as measured by a meter on the second fiber 300b. The steering assembly 326 and WDM assembly 318 are then fixed with respect to the housing of the optical device 332 by laser welding or by other methods known in the art such as, without limitation, gluing, interference fit, staking or clamping. The steering assembly 326 and WDM assembly 318 can be quickly and instinctively manipulated to their optimal positions. Alternatively, the positioning can be more methodical. For instance, the WDM assembly 318 can be rotated to clock points and the steering assembly 326 rotated 360 degrees at each clock point until the best position is located.

Figure 7:
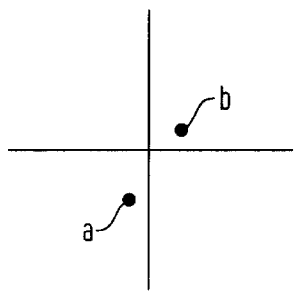
FIG. 7 is a diagram illustrating the angular projection of beams from a WDM assembly and a steering assembly prior to alignment.
Figure 8:
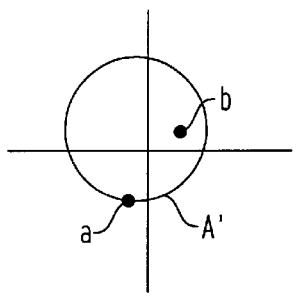
FIG. 8 is a diagram illustrating the angular projection of beams from a WDM assembly and from a rotated steering assembly.

In the illustrated embodiments, two degrees of freedom are provided for optical alignment. One, the rotation of the steering assembly 326 and two, the rotation of the WDM assembly 318. If the steering assembly 326 and the WDM assembly 318 are at random positions, it is unlikely that the direction of light exiting the steering assembly 326 towards the WDM assembly 318 and the direction of light exiting the WDM assembly 318 towards the steering assembly 326 would be in alignment. If a sectional view is taken at 7—7 of FIG. 5, the direction of the light path associated with the steering assembly 326 and of the light path associated with the WDM assembly 318 projected back from 300b would be represented as points a and b in FIG. 7. If the steering assembly 326 is rotated 360 degrees, its light direction would project circle A' as shown in FIG. 8. Because the steering assembly 326 has only one rotational degree of freedom, the possible directions of the projected beam are only on the circle A' itself and not in the area enclosed by the circle A'. Therefore, rotation of the steering assembly 326 alone is unlikely to provide an optimal alignment of the optical device, although it could be used to improve alignment.

Figure 9:
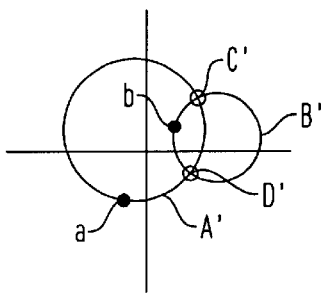
FIG. 9 is a diagram illustrating the angular projection of beams from a rotated WDM assembly and a rotated steering assembly.

If the WDM assembly 318 is rotated 360 degrees, its light emission direction will project a circle B' as shown in FIG. 9. As can be seen in FIG. 9, the circles A', B' formed by the projection of the light paths of the steering assembly 326 and the WDM assembly 318 intersect at two points C', D'. The two points C', D' are optimal alignment points for the optical device 51; these points are solutions where the beam and the destination directions are made parallel.

FIG. 6 shows a preferred embodiment of the invention employed in the four fiber optical device 11,21 of FIGS. 1 and 2, respectively. In FIG. 6, the transmissive bulk optics 406 are fixed in a cylindrical housing 432 having an axis 401. A first WDM assembly 418 is coaxially attached to a first end 462 of the housing 432 through a second collar 438. The first WDM assembly 418 has a jacketed dual fiber termination 400 which is concentrically located within a metal ferrule 434 so that the first and second fibers 400a, 400b terminate at the end of the ferrule 434. A collar 436 is fixed to the ferrule 434 with a laser weld (not shown).

A gradient refractive index (GRIN) lens 402 is concentrically fixed within the second collar 438. The GRIN lens 402 has a beveled end 446 which faces the dual fiber termination 400. The other, flat surface 464 of the GRIN lens 402 is coated with an appropriate WDM film 466 to produce a WDM surface 404. The two collars 436, 438 are abutted, with the beveled end 446 of the GRIN lens 402 facing the dual fiber termination 400. The GRIN lens 402 and the dual fiber termination 400 are fixed together by laser welding.

On the other end 468 of the housing 432 from the first WDM assembly 418 is an adjustable steering assembly 426. The steering assembly 426 has a collar 430. A wedge 428 is concentrically mounted in the collar 430. The steering assembly 426 is coaxially attached to the housing 432 so that the steering assembly 426 is rotatable about its cylindrical axis 470 but fixed in all other respects. Collar 430 has a turned down external diameter 431 which is a slip fit into the sleeve 433 of housing 432 and which abuts a shoulder 435 of housing 432. Other methods known in the art also could be used to attach the rotatable collar 430 to housing 432. For instance, collar 430 may have a loose fit into the sleeve 433 of housing 432, or collar 430 may simply abut housing 432. Such junctions have translational freedom in addition to rotational freedom. Translational freedome may be used to overlap light beam cross-sections in addition to bringing the beams into parallel as set forth herein.

A second WDM assembly 440 having an axis 403, identical to the first WDM assembly 418, similarly is coaxially attached to the steering assembly 426 so that the WDM assembly 440 is rotatable about its cylindrical axis 403 but fixed in all other respects. The second WDM assembly 440 has a housing 424. The external surfaces of the collar 430 and the housing 424 may have mechanical features (not shown) to aid in alignment.

To internally align the apparatus shown in FIG. 6, light is projected through the first fiber 400a of the first WDM subassembly 418 and through the transmissive bulk optics 406. The light is at a wavelength that will be transmitted by both WDM surfaces 404,408. The light passes through the steering assembly 426 and the second WDM assembly 440. A meter (not shown) is used to measure light collected from the second fiber 412b. The steering assembly 426 and second WDM assembly 440 are rotated until the least attenuation of the light beam is indicated by the meter, at which point the steering assembly 426 and second WDM assembly 440 are fixed by laser welding or other methods known in the art. The present invention should not be limited to the particular optical elements 400, 402, 466, 406, 428, 412b shown in the drawings.

FIG. 10 shows another apparatus for use with the four fiber optical devices 11, 21 shown in FIGS. 1 and 2. The apparatus shown in FIG. 10 is essentially the same as the apparatus shown in FIG. 6, except that the apparatus shown in FIG. 10 has a different adjustable steering assembly 526. In particular, the collar 430 and wedge 428 of FIG. 6 are replaced by a universal coupling (or ball joint) 542. The universal coupling 542 connects, and is formed by nesting, curved surfaces 576, 578 of the WDM housing 524 and the optical device housing 532. The surfaces 576 may be spherical. The universal coupling 542 has a central cavity 544. In this embodiment of the invention, alignment is accomplished by transmitting a test light beam through the first fiber 400a and manipulating the universal coupling 542 until the least attenuation of the beam is obtained at an output fiber 412b. At this optimal point, the universal coupling 542 can be fixed by laser welding, interference fit, adjustable collar, locking collar or other methods known in the art.

Figure 11:
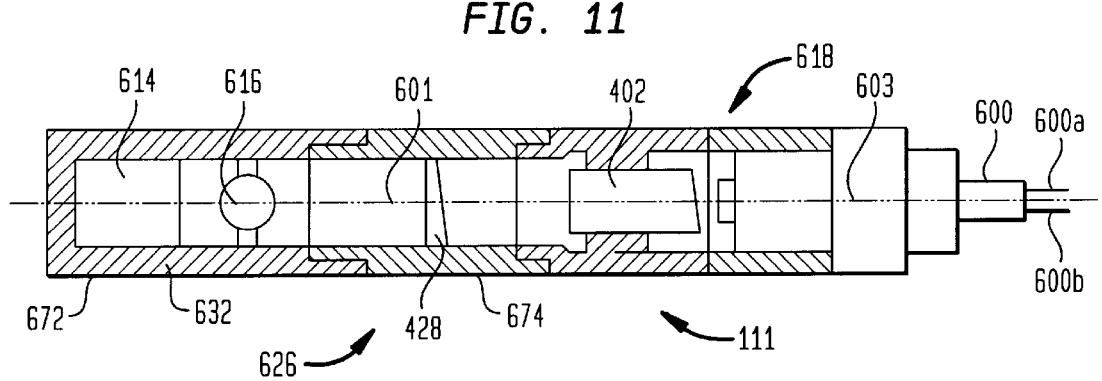
FIG. 11 is a sectional view of an optical device with an internal laser pump, a WDM assembly, and a steering assembly.

FIG. 11 shows a device 111 for use with the two fiber optical devices 31, 41 of FIGS. 3 and 4. The device 111 has a pump laser 614 fixed on a longitudinal axis 601 at a first end 672 of a cylindrical housing 632. Next to the pump laser 614, along the longitudinal axis 601, is located a ball lens 616. At the second end 674 of the housing 632 is rotatably attached a steering assembly 626, identical to that shown in FIG. 6 and explained in detail above. A WDM assembly 618, identical to that shown in FIG. 6 and explained in detail above, and having an axis 603, is rotatably attached to the steering assembly 626 opposite the housing 632. A dual fiber termination 600, with first and second fibers 600a, 600b, is also provided.

To align the optical device 111, the pump laser 614 is energized and the resultant beam emanating through the second fiber 600b is measured with a meter (not shown), and the steering assembly 626 and WDM assembly 618 are rotated until the highest meter reading is obtained. This is the optimal position at which a signal is least attenuated, and is the position at which the steering assembly 626 and WDM assembly 618 are fixed. If desired, the optical wedge steering assembly 626 may be replaced with a universal coupling 542 of the type shown in FIG. 10.

The present invention is not limited to the illustrated embodiments. For example, the invention may be employed with other optical devices than are illustrated herein. Accordingly, it is to be understood that although the present invention has been described with references to preferred embodiments, various modifications may be made to the structures and steps presented herein without departing from the invention which is defined in the claims appended hereto.

The present invention overcomes the problems associated with internally aligning the light pathways of optical devices incorporating bulk optic devices and optical fiber terminations. The invention solves these problems by providing a method and apparatus for simply and inexpensively aligning the light pathways associated with the bulk optic devices and optical fiber terminations in order to reduce optical transmission loss.

What is claimed as new and desired to be protected by Letters Patent of the United States is:

1. A multiple optical fiber device, comprising:
    first and second optical elements, the first optical element having a first light path directed toward the second optical element and the second optical element being rotatable with respect to the first optical element; and
    an adjustable steering assembly for aligning the first light path, the adjustable steering assembly being located between the first and second optical elements, and being fully rotatable with respect to each of the first optical element and the second optical element.

2. The device of claim 1, wherein the adjustable steering assembly includes an optical wedge.

3. The device of claim 1, wherein the adjustable steering assembly includes a ball joint.

4. The device of claim 1, wherein the first optical element includes a source of collimated light.

5. The device of claim 4, wherein the second optical element includes a wavelength division multiplexing surface for transmitting the collimated light.

6. The device of claim 4, wherein the second optical element includes a partially reflecting surface that both transmits and reflects the collimated light.

7. An optical device, comprising:
    an optical assembly for transmitting a light beam;
    a wavelength division multiplexing surface for transmitting and reflecting the light beam; and
    an adjustable steering assembly for aligning the optical assembly and the wavelength division multiplexing surface, the adjustable steering assembly being located between the optical assembly and the wavelength division multiplexing surface, wherein the adjustable steering assembly is fully rotatable with respect to the optical assembly.

8. An optical device, comprising:

an optical assembly for transmitting a light beam;

a coated surface that reflects and transmits for reflecting and transmitting the light beam; and an adjustable steering assembly for aligning the optical assembly and the coated surface that reflects and transmits, the adjustable steering assembly being located between the optical assembly and the,coated surface that reflects and transmits, wherein the adjustable steering assembly is fully rotatable with respect to the optical assembly.

9. The optical device of claim 8, wherein the adjustable steering assembly includes a universal coupling with curved surfaces.

10. The optical device of claim 8, wherein the adjustable steering assembly includes an optical wedge.

11. The optical device of claim 8, wherein the optical assembly includes a dual fiber connection for transmitting a communication signal.

12. The optical device of claim 8, wherein the optical assembly includes a pump laser.

13. An optical amplifier device, comprising:

a first housing supporting a first optical element defining a first light path;

a second housing supporting a second optical element defining a second light path; and an adjustable element for changing the direction of the first light path to cause the first light path to align with the second light path, the adjustable element being located between the first and second housings and being fully rotatable with respect to the first and second housings.

14. The amplifier device of claim 13, wherein the adjustable element includes an optical wedge.

15. The amplifier device of claim 13, wherein the adjustable element includes nesting spherical surfaces.

16. The amplifier device of claim 15, further comprising a pump laser for amplifying a communication signal.

17. The amplifier device of claim 13, further comprising a dual fiber termination, a wavelength division multiplexing surface, and a lens located between the dual fiber termination and the wavelength division multiplexing surface.

18. The amplifier device of claim 17, wherein the lens has a gradient index.

19. The amplifier device of claim 17, further comprising a second dual fiber termination, a second wavelength division multiplexing surface, and a second lens located between the second dual fiber termination and the second wavelength division multiplexing surface.

20. The amplifier device of claim 19, wherein the wavelength division multiplexing surface reflects the communication signal.

21. The amplifier device of claim 19, wherein the wavelength division multiplexing surface transmits the communication signal.

22. A method of making a multiple optical fiber system, said method comprising the steps of:

transmitting a first light beam along a first axis through a first optical element;

adjusting the position of a fully rotatable steering assembly located between the first optical element and a second optical element to change the position of the first light beam, the step of adjusting the position including the step of rotating rotating the steering assembly about the first axis; and transmitting the first light beam having a changed position through the second optical element.

23. The method of claim 22, further comprising the step of measuring the intensity of the light beam in the second optical element.

24. The method of claim 23, wherein the step of transmitting the light beam through the first optical element includes the step of transmitting the light beam through a dual fiber termination.

25. The method of claim 24, further comprising the step of reflecting a second light beam incident on the wavelength division multiplexing surface, the wavelength of the second light beam being different than the wavelength of the first light beam.

26. The method of claim 25, wherein the step of rotating the steering assembly includes the step of rotating an optical wedge.

27. The method of claim 22, wherein the step of transmitting the light beam through the first optical element includes the step of transmitting the light beam through a wavelength division multiplexing surface.

28. The method of claim 22, wherein the step of adjusting the position of the steering assembly includes the step of changing the relative positions of nesting spherical surfaces.

29. A method of operating an optical amplifier device, the method comprising the steps of:

transmitting a pump laser beam through a first housing along a first light path;

transmitting a modulated communication signal through a second housing along a second light path;

changing the direction of light propagating through the optical amplifier device with a fully rotatable adjustable steering assembly to align the first and second light paths; and subsequently, multiplexing the pump laser beam and the modulated communication signal to amplify the modulated communication signal.

30. The method of claim 29, further comprising the step of using a wavelength division multiplexing surface to selectively transmit and reflect the pump laser beam and the modulated communication signal.

31. The method of claim 30, further comprising the step of transmitting the pump laser beam through a dual fiber termination.

32. The method of claim 30, further comprising the step of transmitting the modulated communication signal through a dual fiber termination.

33. The method of claim 29, further comprising the step of using a lens to transmit light toward and away from the wavelength division multiplexing surface.

* * * * *